US010554546B1

(12) United States Patent
Graham et al.

(10) Patent No.: US 10,554,546 B1
(45) Date of Patent: Feb. 4, 2020

(54) SYSTEM MODELING OF DATA CENTERS TO DRIVE CROSS DOMAIN CHARACTERIZATION, AUTOMATION, AND PREDICTIVE ANALYTICS

(71) Applicant: EMC Corporation, Hopkinton, MA (US)

(72) Inventors: Stephen Graham, Chapel Hill, NC (US); Harrison Roberts, Boxborough, MA (US); Kenneth Fickie, Ashland, MA (US); Kent Bair, Colorado Springs, CO (US); Shankar Jagannathan, Southborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 475 days.

(21) Appl. No.: 13/930,286

(22) Filed: Jun. 28, 2013

(51) Int. Cl.
*H04L 12/721* (2013.01)
(52) U.S. Cl.
CPC .................... *H04L 45/70* (2013.01)
(58) Field of Classification Search
CPC .............. H04L 12/1403; H04L 12/141; H04L 12/1432; H04L 12/1439; H04L 12/1836; H04L 12/1868; H04L 41/0803; H04L 41/064; H04L 41/0816; H04L 41/0826; H04L 41/0886; H04L 45/70; H04L 43/04; H04L 43/062; H04L 43/08;
(Continued)

(56) References Cited

U.S. PATENT DOCUMENTS

| 4,852,018 A | * | 7/1989 | Grossberg | ................ B25J 9/163 700/259 |
| 5,721,843 A | * | 2/1998 | Ganti | ........................ G06T 9/00 370/248 |
| 8,386,930 B2 | | 2/2013 | Dillenberger et al. | |

(Continued)

FOREIGN PATENT DOCUMENTS

WO    2014137559 A1    9/2014

OTHER PUBLICATIONS

Hakan Hjalmarsson; "Iterative Feedback Tuning—an Overview", Control Signal Process. 2002, International Journal of Adaptive Control and Signal Processing.*

(Continued)

*Primary Examiner* — Tonia L Dollinger
*Assistant Examiner* — Jihad K Boustany
(74) *Attorney, Agent, or Firm* — BainwoodHuang

(57) ABSTRACT

An improved technique involves using a systems dynamics model in an information technology (IT) data center in order to determine an optimal distribution of data among data center devices. Along these lines, a data center control server takes measurements of devices across an IT data center over time and compares these measurements to quantities specified in set points (e.g., a service level agreement (SLA)) to produce deviations. The data center control server then inputs the deviations from the set points into a systems dynamics engine that determines a configuration of the devices in the IT data center so that output from the IT data center satisfies a set of constraints, including those specified (Continued)

in the SLA. The data center control server then configures the IT data center devices according to the configuration to send incoming data along the specified data paths.

18 Claims, 4 Drawing Sheets

(58) Field of Classification Search
CPC ..... H04L 63/1425; H04L 47/10; H04L 47/00; G06Q 40/00; G06Q 30/00
See application file for complete search history.

(56) References Cited

U.S. PATENT DOCUMENTS

| | | | | |
|---|---|---|---|---|
| 2002/0198985 | A1* | 12/2002 | Fraenkel et al. | 709/224 |
| 2003/0110276 | A1* | 6/2003 | Riddle | H04L 41/083 709/230 |
| 2003/0177160 | A1* | 9/2003 | Chiu | G06Q 10/06 718/100 |
| 2005/0113098 | A1* | 5/2005 | Cankaya | H04J 14/0227 455/446 |
| 2010/0274890 | A1* | 10/2010 | Patel | G06F 9/4862 709/224 |
| 2011/0320586 | A1* | 12/2011 | Maltz et al. | 709/224 |
| 2012/0131222 | A1* | 5/2012 | Curtis | H04L 47/2441 709/235 |
| 2013/0051788 | A1* | 2/2013 | Marcenaro | H04L 41/12 398/16 |
| 2013/0084826 | A1* | 4/2013 | Mo | H04L 41/5029 455/406 |
| 2013/0104128 | A1* | 4/2013 | Kurita | 718/1 |
| 2014/0297569 | A1 | 10/2014 | Clark et al. | |
| 2014/0316953 | A1* | 10/2014 | Pangarkar | G06Q 30/0283 705/30 |
| 2017/0230298 | A1* | 8/2017 | Perry | H04L 43/0876 |

OTHER PUBLICATIONS

Wikipedia; Control Theory; https://en.wikipedia.org/wiki/Control_theory; Last edited Feb. 16, 2018.*
Google Search: Sensor;nbsp;https://www.google.com/search?q=sensor&rlz=1C1GCEA_enUS798US798&oq=se&aqs=chrome.0.69i59j69i60l3j69i57j69i60.997j0j7&sourceid=chrome&ie=UTF-8 (Year: 2018).*
Steven H. Low and David Lapsley; "Optimization Flow Control—I: Basic Algorithm and Convergence"; IEEE/ACM Transactions on Networking; vol. 7 No. 6; Dec. 1999 (Year: 1999).*
Lotfi Benmohamed and Semyon M. Meerkov; "Feedback Control of Congestion in Packet Switching Networks: The Case of a Single Congested Node"; IEEE/ACM Transactions on Networking; vol. 1, No. 6; Dec. 1993 (Year: 1993).*

* cited by examiner

SYSTEM MODELING OF DATA CENTERS TO DRIVE CROSS DOMAIN CHARACTERIZATION, AUTOMATION, AND PREDICTIVE ANALYTICS

BACKGROUND

Data centers are facilities used to house computer systems and associated components, primarily computing, network, and storage systems. These data centers process data from a host computer owned by a tenant by routing the data from an ingress point to a terminal database server or storage array.

The amount of data that such a data center processes for a tenant may be governed by a service level agreement (SLA). For example, suppose that a bank needs to authenticate a series of requests to access customer accounts. To accomplish this, the bank sends transaction data—in some cases, at a rate specified in an SLA—over a network to an authentication data center that houses authentication database servers and associated data storage systems. The data center then routes the transactions through a switching fabric to the database servers in order to perform lookups in storage to generate authentication results at a rate specified by the SLA. It should be understood that different applications may need different IO rates to maintain functionality, the data rates and network parameters of normal operation define a SLA balanced with the cost for SLA requirements.

Such data centers enforce rates specified in SLAs by using redundant processing, storage, and routing components. Suppose that, in the above authentication example, one of the database servers goes down. In such a situation, without redundant equipment, a data center would likely not be able to satisfy a minimum service level specified in an SLA. The data center uses overallocation and the redundancy of its components to tolerate component failure or degradation of components and paths in such a way that the terms of the SLAs remain satisfied.

Nevertheless, to further ensure reliability, i.e., to satisfy the SLAs and not cause any equipment breakdowns in doing so, conventional data centers have a human administrator monitor the various components to react to various situations in the data center as they arise. For example, by observing accesses per minute on a set of database servers, the administrator can perform load balancing across the servers to avoid one server going down from overutilization.

SUMMARY

Unfortunately, there are deficiencies in the above-described conventional data centers. For example, the administrator takes continuous measurements of data center components in isolation in order to react to events within the data center. This, however, is neglecting the reality that the behavior of one component is coupled to every other component in the data center to varying degrees. In neglecting this coupled system level behavior, the administrator is primarily limited to reactive measures to avoid near-catastrophic conditions (e.g., data unavailability) that may cause a violation of an SLA before such conditions appear.

Further, some conventional data centers overallocate DC resources to avoid impact of component failures or degradation of connectivity or operation and to adjust to unpredictable demand levels from application users and systems which vary over time. The more mission critical a system, the more over allocated capacity and resources must be due to lack of ability to see system wide correlations and adjust dynamically.

In contrast to the above-described conventional data centers which are ill-equipped to plan ahead to avoid near-catastrophic conditions, an improved technique involves using a systems dynamics model in an information technology (IT) data center in order to determine an optimal distribution of data among data center devices. Along these lines, a data center control server takes measurements of devices across an IT data center over time and compares these measurements to quantities specified in set points (e.g., a service level agreement (SLA)) to produce deviations. The data center control server then inputs the deviations from the set points into a systems dynamics engine that determines a configuration of the devices in the IT data center so that output from the IT data center satisfies a set of constraints, including those specified in the SLA. The data center control server then configures the IT data center devices according to the configuration to send incoming data along the specified data paths.

Advantageously, the improved technique provides for a global, rather than a local view of an IT data center in space (i.e., topology) and time. A systems dynamics model is able to exploit coupled relationships between the various devices in the IT data center through a series of differential, or difference, equations; therefore, the data center control server can predict the effect on a third device of routing data away from a first device and toward a second, for example. Also, by arranging the control server as part of a closed-loop feedback system, the control server can cause an automation platform to make adjustments to the IT data center devices in a proactive, rather than a reactive manner. Further, the systems dynamics model makes what-if or simulation analysis possible for more long-term planning. Still further, the improved techniques may be applied to Software Defined Storage (SDS) and Software Defined Networking (SDN), which have a higher change rate and more dynamic system states-requiring a greater degree of automation at a system level One embodiment of the improved technique is directed to a method of controlling an IT data center, the IT data center being constructed and arranged to distribute data between a set of hosts and a set of IT data center devices, each of the set of IT data center devices being described by a set of device parameters. The method includes receiving, by a systems dynamics engine, a set of acquired measurement results, each of the set of acquired measurement results providing a measured value of a device parameter describing an IT data center device of the set of IT data center devices. The method also includes comparing, by the systems dynamics engine, the set of acquired measurement results to a set of expected measurement results to produce a set of measurement deviations. The method further includes applying, by the systems dynamics engine, a systems dynamics model to the set of measurement deviations, the system dynamics model being configured to output a distribution of data among IT data center devices of the set of IT data center devices, the systems dynamics model providing control of the IT data center as a whole by considering interactions between the IT data center devices.

Additionally, some embodiments of the improved technique are directed to a data storage apparatus constructed and arranged to control an IT data center. The data storage apparatus includes a set of storage devices and a storage processor. The storage processor includes memory and a set of processors coupled to the memory to form controlling circuitry. The controlling circuitry is constructed and arranged to carry out the method of controlling an IT data center.

Furthermore, some embodiments of the improved technique are directed to a computer program product having a non-transitory computer readable storage medium which stores code including a set of instructions which, when executed by a computer, cause the computer to carry out the method of controlling an IT data center.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 3b is an example controller within the closed-loop feedback system shown in FIG. 3a.

DETAILED DESCRIPTION

An improved technique involves using a systems dynamics model in an information technology (IT) data center in order to determine an optimal distribution of data among data center devices. Along these lines, a data center control server takes measurements of devices across an IT data center over time and compares these measurements to quantities specified in set points (e.g., a service level agreement (SLA)) to produce deviations. The data center control server then inputs the deviations from the set points into a systems dynamics engine that determines a configuration of the devices in the IT data center so that output from the IT data center satisfies a set of constraints, including those specified in the SLA. The data center control server then configures the IT data center devices according to the configuration to send incoming data along the specified data paths.

Advantageously, the improved technique provides for a global, rather than a local view of an IT data center in space (i.e., topology) and time. A systems dynamics model is able to exploit coupled relationships between the various devices in the IT data center through a series of differential, or difference, equations; therefore, the data center control server can predict the effect on a third device of routing data away from a first device and toward a second, for example. Also, by arranging the control server as part of a closed-loop feedback system, the control server can cause an automation platform to make adjustments to the IT data center devices much faster than a typical human intervention, such that instabilities can be caught early and remediated before becoming a problem. Further, the systems dynamics model makes what-if analysis possible for more long-term planning.

Figure 1:
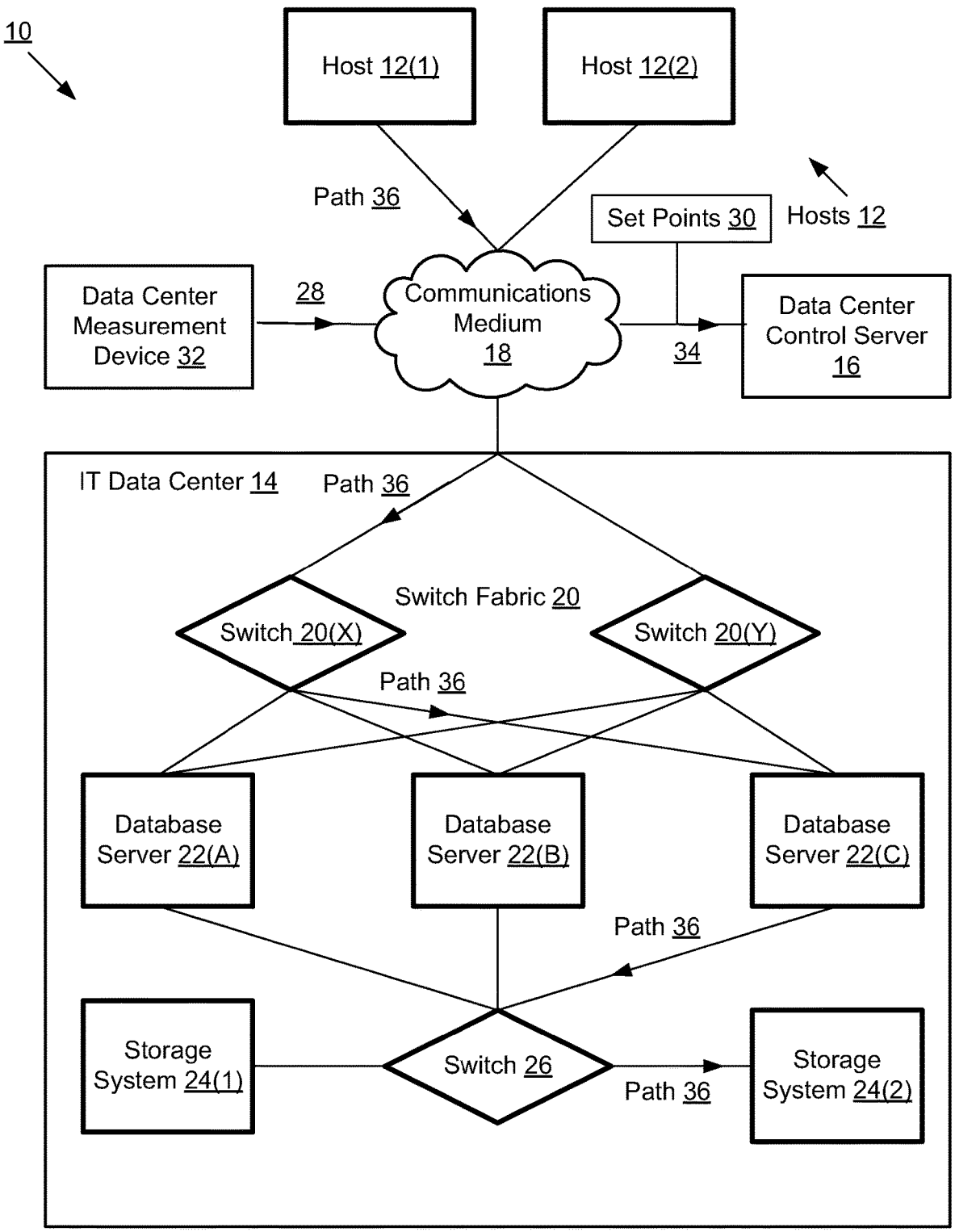
FIG. 1 is a block diagram illustrating an example electronic environment for carrying out the improved technique.

FIG. 1 illustrates an example electronic environment 10 in which the improved technique is carried out. Electronic environment 10 includes hosts 12, IT data center 14, data center control server 16, communications medium 18, and data center measurement device 32.

Hosts 12(1) and 12(2) (hosts 12) are typically servers belonging to a tenant of IT data center 14. Hosts 12 are configured to send data to IT data center 14 over communications medium 18. For example, hosts 12 may be bank servers that process transactions and sends transaction data to IT data center 14 for authentication. In some arrangements, however, hosts 12 may be desktop PCs, laptop computer, tablet computers, or the like.

IT data center 14 is configured to accept data from hosts 12 and route the data to a terminal according to instructions from the tenant. IT data center 14, as illustrated in FIG. 1, includes switch fabric 20; database servers 22(A), 22(B), and 22(C) (database servers 22); and storage systems 24(1) and 24(2) (storage systems 24). It should be understood that each of the switches in switch fabric 20, database servers 22, and storage systems 24 provide redundancy within IT data center 14. It should also be understood that multiple switches may be between the database servers and storage.

Switch fabric 20 is configured to route data packets arriving over communications medium 18 to database servers 22 and storage systems 24. Switch fabric 20 includes switches 20(X) and 20(Y), each of which sends data packets to one of database servers 22(A), 22(B), and 22(C).

Database servers 22 are configured to receive data packets from switch fabric 20 and perform a database lookup operation according to the contents of the data packets. Database servers 22 are also configured to generate lookup instructions for storage systems 24, on which database entries are stored. For example, data packets containing instructions to perform an authentication operation on a particular username will cause a database server, say, 22(C), to access records pertaining to that username in storage system 24(2).

Storage systems 24(1) and 24(2) (storage systems 24) are configured to store database entries accessible to database servers 22. Storage systems 24 are, in some arrangements, storage arrays along with storage processors that are configured to operate the storage arrays. In IT data center 14 as illustrated in FIG. 1, database servers 22 each access storage systems 24 via switch 26.

In some arrangements, there may be a cost associated with each switch in switch fabric 20, database server 22, and storage system 24. Such a situation may arise if, for example, one switch has a higher bit rate than another, or one database server has a higher rate of access than another or one storage system has more expensive storage than another. The total cost of a data path, then, is the sum of the costs of the components through which the data path goes.

Communications medium 18 provides network connections between hosts 12, IT data center 14, data center control server 16, and data center measurement device 32. Communications medium 18 may implement a variety of protocols such as TCP/IP, UDP, ATM, Ethernet, Fibre Channel, combinations thereof, and the like. Furthermore, communications medium 18 may include various components (e.g., cables, switches/routers, gateways/bridges, NAS/SAN appliances/nodes, interfaces, etc.). Moreover, the communications medium 18 is capable of having a variety of topologies (e.g., queue manager-and-spoke, ring, backbone, multi drop, point to-point, irregular, combinations thereof, and so on).

Data center control server 16 is configured to control parameter values of devices inside IT data center 14 so as to satisfy metrics such as data availability as well as constraints expressed in set points 30. Data center control server 16 is configured to provide such control by applying a systems dynamics model to differences between measurements of parameters received from data center measurement device 32 and expected values of those parameters expressed in set points 30. Further details about data center control server are discussed below in connection with FIG. 2.

Figure 2:
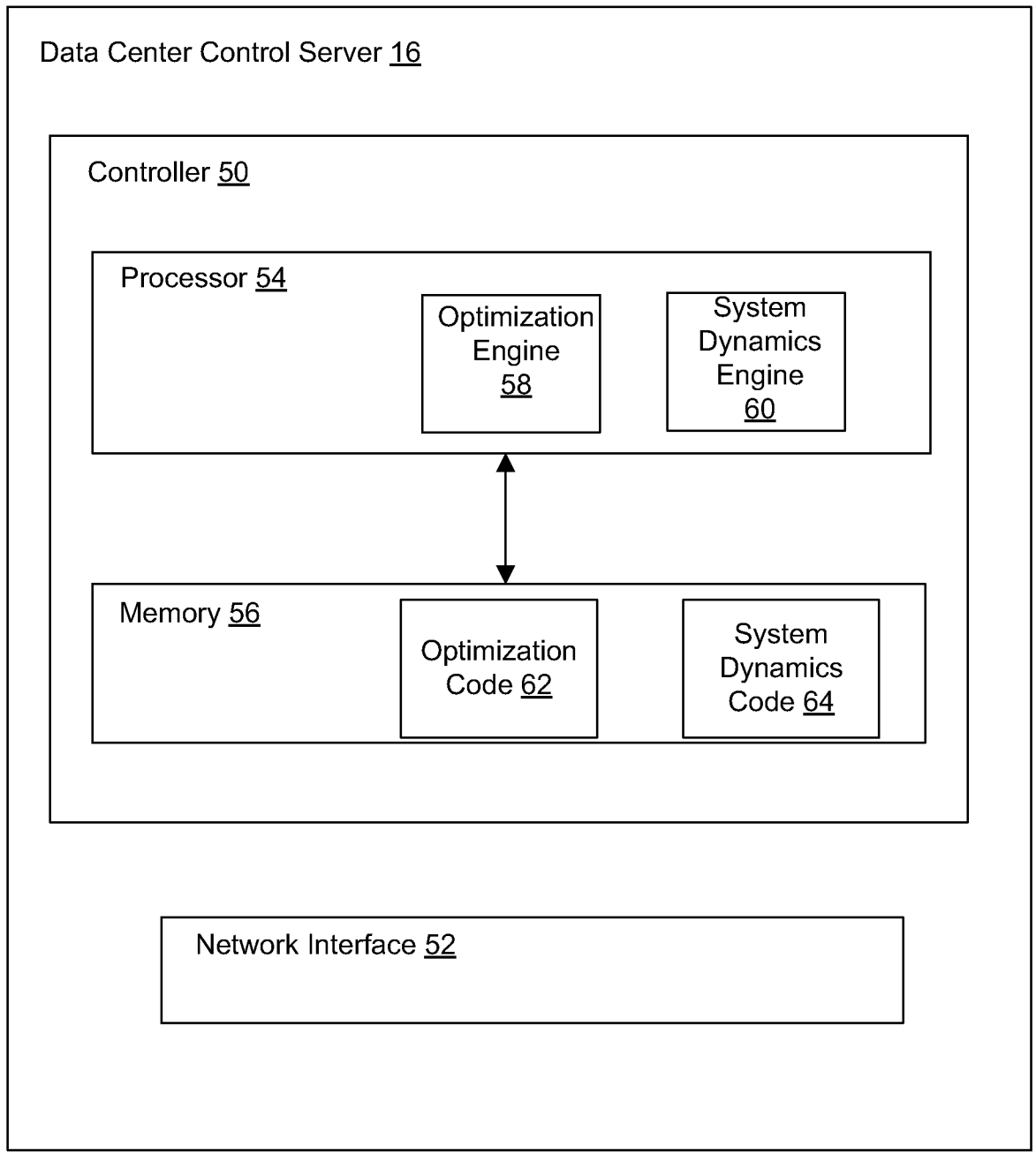
FIG. 2 is a block diagram illustrating an example data center control engine within the electronic environment shown in FIG. 1.

FIG. 2 illustrates an example data center control server 16. As illustrated in FIG. 2, data center control server 16 includes controller 50, which in turn includes processor 54 and memory 56, and network interface 52.

Network interface 52 takes the form of an Ethernet card; in some arrangements, network interface 52 takes other forms including a wireless receiver and a token ring card.

Memory 56 is configured to store parameter values which get input into systems dynamics engine 60 and optimization engine 58. Memory 56 is also configured to store code which includes systems dynamics code 64 and optimization code 62. Systems dynamics code 64 includes instructions for carrying out a systems dynamics analysis of IT data center 14. Optimization code 62 includes instructions for carrying out an optimization of device parameters over a total cost of possible data paths within IT data center 14. Memory 46 generally takes the form of, e.g., random access memory, flash memory or a non-volatile memory.

Processor 54 takes the form of, but is not limited to, Intel or AMD-based MPUs, and can include a single or multi-cores each running single or multiple threads. Processor 54 is coupled to memory 56 and is configured to execute instructions from systems dynamics code 64 and optimization code 62. Processor 54 includes optimization engine 58 and systems dynamics engine 60.

Returning to FIG. 1, data center measurement device 32 is configured to perform measurements of various parameters of devices within IT data center 14. For example, data center measurement device 32 may take measurements of bandwidths of switches in switch fabric 20, access rates of database servers 22, and unused storage capacity in storage systems 24. In some arrangements, data center measurement device 32 may also make measurements of other devices in IT data center 14 such as thermometers. Data center measurement device 32 is a computer; in some arrangements, however, data center measurement device 32 may be a server. Further, while data center measurement device 32 is shown in FIG. 1 as being outside of IT data center 14, in some arrangements, data center measurement device 32 may be located inside IT data center 14.

During operation, data center control server 16 receives measurement values 28 from data center measurement device 32 that represent values of parameters of devices within IT data center 14 at a snapshot in time. For example, data control measurement device 32 measures, for example, a bit rate $A_{ij}$ on data from host $12(i)$ arriving at switch $20(j)$, bit rate $B_{jk}$ on data leaving from switch $20(j)$ and arriving at database server $22(k)$, access rate server $C_{ki}$ on database server $22(k)$ from host $12(i)$, and amount of data arriving for storage at storage system $24(m)$ from database server $22(k)$ $D_{km}$. Upon taking measurements 28, data control measurement device 32 sends measurements 28 to data center control server 16 over communications medium 18. In some arrangements, however, data control measurement device 32 is co-located with data center control server 16.

Upon receipt of measurements 28, data center control server 16 compares them with values of the parameters specified in set points 30 and computes the differences 34. In some arrangements, the values specified in set points 30 represent service level agreements (SLAs) with each host 12. For example, one set point for host 12(1) may specify the total bit rate being delivered to switches in switch fabric 20, e.g. $A_{1X}+A_{1Y}$, and the total access rate from database servers 22, e.g., $C_{A1}+C_{B1+}C_{C1}$. Data center control server 16 then forms deviations 34 from these specified parameter values 30 by computing differences between the specified values 30 and (filtered) measurements 28.

It should be understood that the parameters discussed above may be required to satisfy further constraints due to physical and/or economic considerations. For example, because switches in switch fabric 20 do not store and should not lose any data, there is a conservation law which takes, for example, the form $A_{1X}+A_{2X}=B_{XA}+B_{XB+}B_{XC}$, i.e., net data into a switch equals net data out of a switch. Further, a switch may have a maximum bit rate, e.g., 20 Gb/sec, at which it can possibly transfer data, i.e. $A_{1X}+A_{2X}<20$ Gb/sec. Such constraints are stored in memory 56.

Data control server 16 then inputs deviations 34 into systems dynamics engine 60. As discussed above, systems dynamics engine 60 is configured to solve a system of coupled differential or difference equations that express relationships between, for example, a change in the bit rate emanating from a switch, say, 20(X), and a corresponding change in the access rate of a database server 22, say, 22(C). In systems dynamics language, a data access rate on database server 22 or an amount of storage in storage system 24 represents a stock, and the change of a stock due to an interaction between devices is a flow. Each equation for the stocks may take the form $$\frac{d}{dt}C = F(A, B, C)$$

where the A, B, C represents stocks and F is a flow of data. The solution of these equations provides data paths emanating from hosts 12 to database servers 22 that ensure the parameters of the devices in IT data center 14 satisfy all constraints imposed by physics, economics, and set points 30.

For example, suppose that IT data center 14 is an authentication facility which receives requests for authentication from hosts 12. Database servers 22 would then correspond to authentication servers which perform lookups on storage systems 24 for user data so that authentication results (e.g., a risk score) may be computed and sent back to hosts 12. The access rate for each of database servers 22 corresponds to a rate at which that authentication server 22 may generate authentication results. The SLAs in set points 30 correspond to a guarantee to the tenant (i.e., the bank) as to how many transactions per unit time (stock) will be processed in IT data center 14. A major function of data center control server 16, then is to automate the adjustment of devices in IT data center 14 so that the SLAs are enforced. As will be discussed further in connection with FIGS. 3a and 3b below, data center control server 16 is part of a controller that performs these adjustments.

In some arrangements, data center control server 16, via optimization engine 58, performs an optimization over a cost metric in order to satisfy further constraints and possibly lower the dimensionality of the parameter space in the systems dynamics model. For example, each of the switches may have a cost associated with them, e.g., switch 20(X) costs $10 per bit/sec, while switch 20(Y) costs $5 per bit/sec. Thus the cost of using the switches is 10 $(A_{1X}+A_{2X})+20$ ($A_{1Y}+A_{2Y}$). Similar cost functions can be constructed for database servers 22 and storage systems 24.

After solution, data center control server 16 outputs paths along which data input from hosts 12 are to be sent to database servers 22 or storage systems 24. One such path 36 is illustrated in FIG. 1, along which data from host 12(1) is sent at a prescribed rate to switch 20(X), then onto database server 22(C), which accesses storage on storage system 24(2).

Figure 3A:
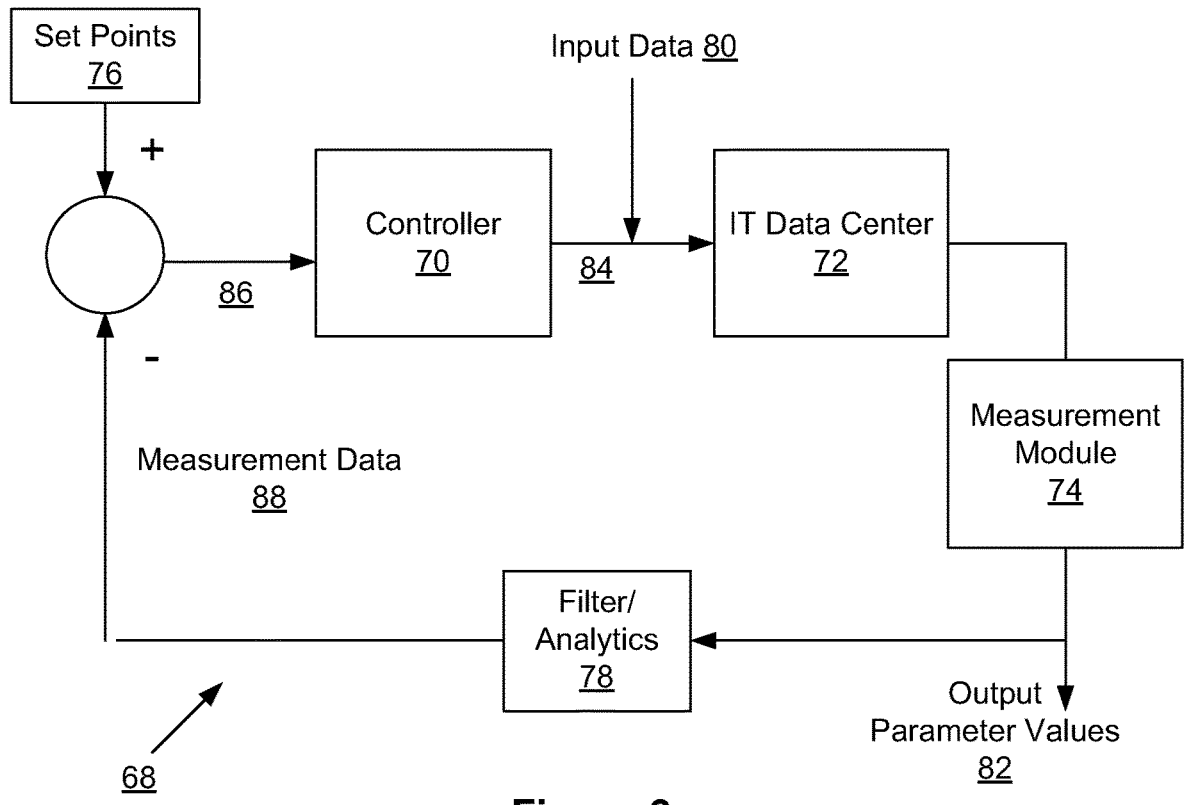
FIG. 3a is a block diagram illustrating an example closed-loop feedback system within the electronic environment shown in FIG. 1.

FIG. 3a illustrates a diagram of IT data center 14 expressed in terms of a closed-loop control system 68. Closed-loop control system 68 includes a controller 70, IT data center 72, and measurement module 74. In addition, FIG. 3a illustrates a filtering module 78. It should be understood that a closed-loop control system provides a well-known model for making predictive analyses about complex systems such as IT data center 72.

IT data center 72 is akin to IT data center 14 (see FIG. 1). As illustrated in FIG. 3a, IT data center 72 takes in inputs 80 (e.g., from hosts 12m see FIG. 1) as well as instructions for routing inputs 80 through IT data center 72. In the language of control systems theory, IT data center 72 acts as a plant.

Measurement module 74 is akin to data center measurement device 32 (see FIG. 1). Measurement module 74 acts on IT data center 72 to produce output parameter values 82 which describe the states of devices within IT data center 72. In the language of control systems theory, measurement module 74 acts as a sensor.

In some arrangements, it may be necessary to choose a subset of output parameter values 82 for feedback. For example, the sheer volume of measurements output from measurement module 74 may make analysis using systems dynamics infeasible. In this case, filtering module 78 selects measurements for comparison with set points 76 according to instructions specified in an analytics framework.

Controller 70 then takes in as input a difference between parameter values 82 output from either measurement module 74 or filter 78 and values specified in set points 76 and outputs instructions for adjusting IT data center 72. Further details about controller 70 are described below in connection with FIG. 3b.

Figure 3B:
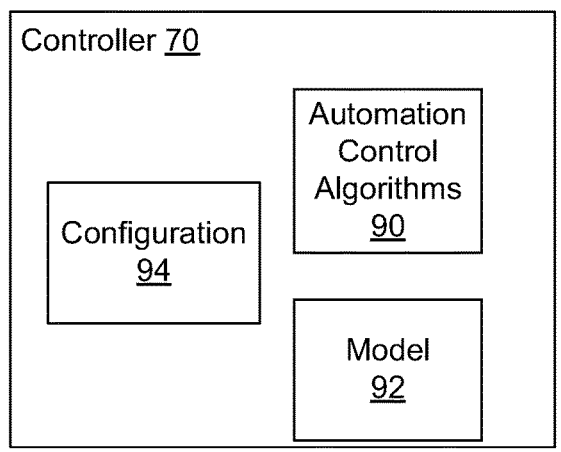

FIG. 3b illustrates an example controller 70 and its components, including automation control algorithms 90, systems dynamics models 92, and configuration module 94.

Automated control algorithms 90 include instructions for carrying out solutions to coupled equations in the systems dynamics framework. In some arrangements, algorithms 90 also includes instructions for carrying out a cost optimization as discussed above.

Systems dynamics models 92 include instructions for performing the solution of the coupled equations in the automated control algorithms 90. For example, systems dynamics models 92 may contain tuning parameters derived in training steps in a machine learning environment.

Configuration module 94 prescribes a configuration of IT data center 72 based on optimal data paths determined by automated control algorithms 90. Configuration automation as provided in configuration module 94 is provided in the storage system platforms ViPR™, provided by EMC Corp. of Hopkinton, Mass.

Returning to FIG. 3a, controller 70 takes as input deviations 86 between outputs 82 and set points 76 and determines adjustments to IT data center 72. Such adjustments take the form of adjustments to data paths along with data is sent within IT data center 72, as well as possible repair of devices within IT data center 72 or a distribution of data stored across the data center. This then completes the feedback loop 68, and the process repeats over time.

It should be understood that, in some arrangements, several time steps worth of data may be stored in memory 56 (see FIG. 2) as a time series to be input into automated control algorithms 90. Such input allows the systems dynamics framework to consider couplings in both space (i.e., topology of IT data center 72) and time.

Figure 4:
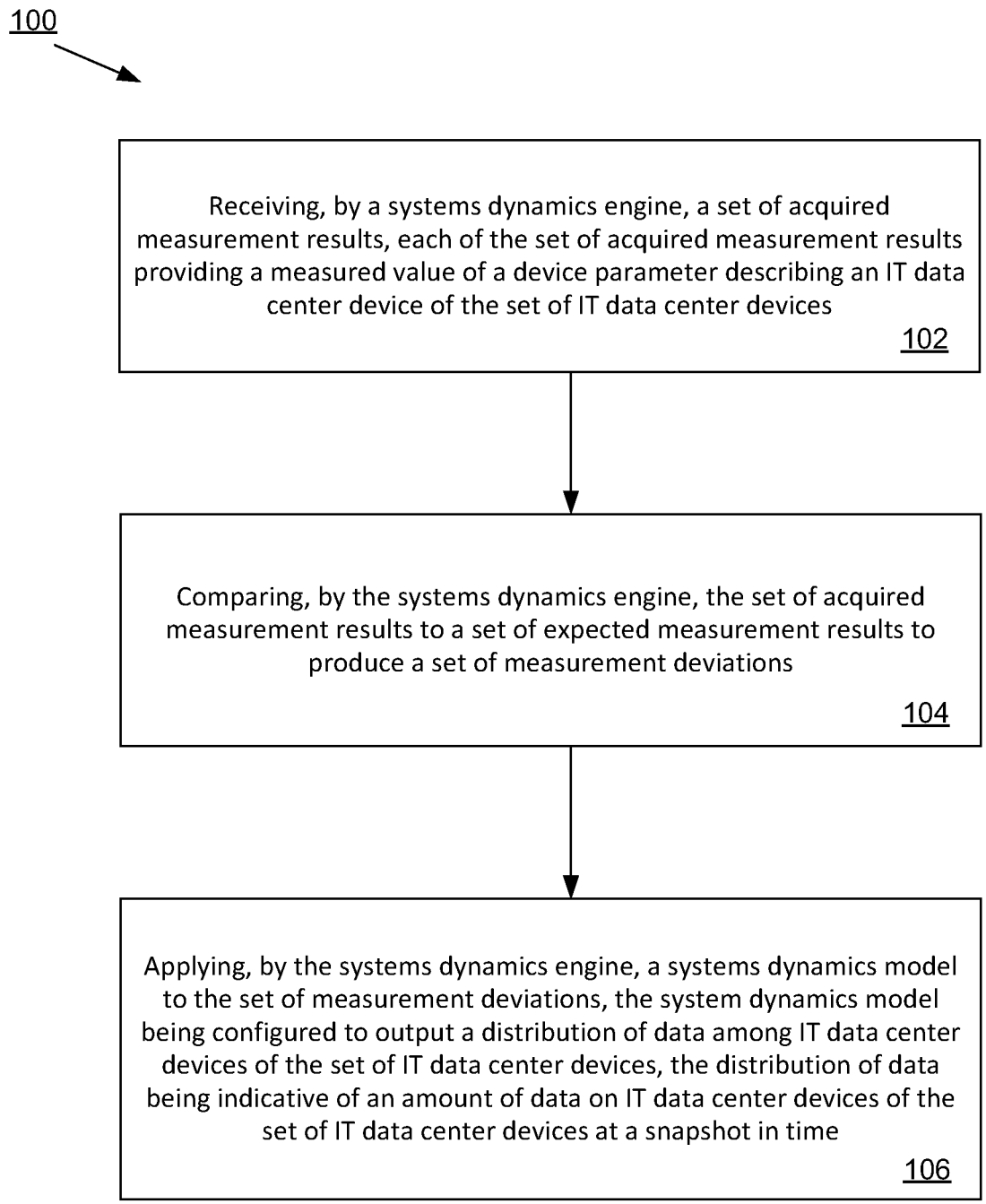
FIG. 4 is a flow chart illustrating an example method of carrying out the improved technique within the electronic environment shown in FIG. 1.

FIG. 4 illustrates a method 100 of controlling an information technology (IT) data center, the IT data center being constructed and arranged to distribute data between a set of hosts and a set of IT data center devices, each of the set of IT data center devices being described by a set of device parameters, including steps 102, 104, and 106.

In step 102, a set of acquired measurement results are received, each of the set of acquired measurement results providing a measured value of a device parameter describing an IT data center device of the set of IT data center devices. These measurement results take the form of, say, access rates on database server 22, and may be filtered due to prespecified analytics.

In step 104, the set of acquired measurement results are compared to a set of expected measurement results to produce a set of measurement deviations. These expected measurement results are typically specified in a service level agreement (SLA) guaranteeing a level of service to a tenant that generates data on a host 12.

In step 106, a systems dynamics model is applied to the set of measurement deviations, the system dynamics model being configured to output a distribution of data among IT data center devices of the set of IT data center devices, the systems dynamics model providing control of the IT data center as a whole by considering interactions between the IT data center devices.

As used throughout this document, the words "comprising," "including," and "having" are intended to set forth certain items, steps, elements, or aspects of something in in that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the above discussion mainly referred to an authentication application concerning access rates on database servers. There are clearly many more applications, such as load balancing a massive storage environment.

Also, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like. Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A method of controlling a data center, the data center including data center devices, the method comprising:

receiving, from a measurement module by data center controlling circuitry, a set of acquired measurement results, each of the set of acquired measurement results providing a measured value of a device parameter describing an IT data center device of the set of IT data center devices, the set of acquired measurement results including an initial value of a flow parameter describing a flow of a stock from a first set of the data center devices of the data center to a second set of the data center devices of the data center resulting from an initial configuration of the first set of the data center devices and the second set of the data center devices, the measurement module acting as a feedback-control sensor;

comparing, by the data center controlling circuitry, the initial value of the flow parameter to an expected value of the flow parameter to produce a flow parameter value difference, the expected value received as a setpoint provided as input to the data center controlling circuitry;

inputting, by the data center controlling circuitry, the flow parameter value difference into feedback model circuitry, the feedback model circuitry outputting instructions for adjusting the data center to establish a new configuration of the first set of the data center devices and the second set of the data center devices, the data center acting as a feedback-control plant;

adjusting the data center, in accordance with the instructions for adjusting the data center, to implement the new configuration of the data center, said adjusting including changing data paths along which data is sent within the data center;

operating the data center in the new configuration under closed-loop feedback control from the feedback model circuitry, to produce a new value of the flow parameter that is closer to the expected value of the flow parameter than the initial value of the flow parameter; and repeating the acts of receiving, comparing, inputting, and operating under closed-loop feedback control, wherein the first set of the data center devices includes a set of switches and the second set of the data center devices includes a set of servers, wherein receiving the initial value of the flow parameter includes:

for each unique switch-server path between a switch of the set of switches and a server of the set of servers, counting the number of transactions per unit time passing through the switch of that path and arriving at the server of that path; and summing the number of transactions per unit time over each unique path to produce the initial value of the flow parameter;

wherein there is a cost to send a respective number of transactions per unit time from each of the set of switches, and wherein the method further comprises:

summing the costs to send the respective number of transactions per unit time over each of the set of switches to form an initial total cost of sending a total number of transactions per unit time from the set of switches; and inputting the total cost into the feedback model to output the new configuration of the first set of the data center devices and the second set of the data center devices, the new configuration further producing a new total cost of sending the total number of transactions per unit time from the set of switches that is less than an expected value of the total cost of sending the total number of transactions per unit time from the set of switches.

2. A method as in claim 1, wherein the data center devices include data routing devices and data destination devices; and wherein receiving the initial value of the flow parameter includes:

obtaining i) a rate at which data is sent through a data routing device and ii) a rate at which the data arrives at a data destination device.

3. A method as in claim 2, wherein, for each of the data routing devices, there is a respective cost to send data through that data routing device; and wherein inputting the flow parameter value difference into the feedback model includes:

performing an optimization operation to minimize a net cost of data flowing from the data routing devices to the data destination devices.

4. A method as in claim 3, wherein, for each of the data destination devices, there is a cost to receive an amount of data at that data destination device; and wherein performing the optimization operation on the sum of costs includes:

adding, to the net cost, costs of the data received at the data destination devices.

5. A method as in claim 1, further comprising:

after inputting the flow parameter value difference into the feedback model, performing a reconfiguration operation on the data center devices, the reconfiguration operation arranging the data center devices to produce the new value of the flow parameter output by the systems dynamics engine.

6. A method as in claim 5, further comprising:

after performing the reconfiguration operation and after at least one specified time step, i) acquiring a time series of the value of the flow parameter, and ii) inputting the time series into the feedback model to output another value of the flow parameter.

7. An electronic apparatus constructed and arranged to control a data center, the data center including data center devices, the apparatus comprising:

a network interface;

memory; and a controller including controlling circuitry constructed and arranged to:

receive, from a measurement module, a set of acquired measurement results, each of the set of acquired measurement results providing a measured value of a device parameter describing an IT data center device of the set of IT data center devices, the set of acquired measurement results including an initial value of a flow parameter describing a flow of a stock from a first set of the data center devices of the data center to a second set of the data center devices of the data center resulting from an initial configuration of the first set of the data center devices and the second set of the data center devices, the measurement module acting as a feedback-control sensor;

compare the initial value of the flow parameter to an expected value of the flow parameter to produce a flow parameter value difference, the expected value received as a setpoint provided as input to the data center controlling circuitry;

input the flow parameter value difference into feedback model circuitry, the feedback model circuitry outputting instructions for adjusting the data center to establish a new configuration of the first set of the data center devices and the second set of the data center devices, the data center acting as a feedback-control plant;

adjust the data center, in accordance with the instructions for adjusting the data center, to implement the new configuration of the data center, including changing data paths along which data is sent within the data center;

operate in the new configuration under closed-loop feedback control from the feedback model circuitry, producing a new value of the flow parameter that is closer to the expected value of the flow parameter than the initial value of the flow parameter; and repeat the acts of receiving, comparing, inputting, and operating under closed-loop feedback control, wherein the first set of the data center devices includes a set of switches and the second set of the data center devices includes a set of servers, wherein the controlling circuitry constructed and arranged to receive the initial value of the flow parameter is further constructed and arranged to:

for each unique switch-server path between a switch of the set of switches and a server of the set of servers, count the number of transactions per unit time passing through the switch of that path and arriving at the server of that path; and sum the number of transactions per unit time over each unique path to produce the initial value of the flow parameter;

wherein there is a cost to send a respective number of transactions per unit time from each of the set of switches, and wherein the controlling circuitry is constructed and arranged to:

sum the costs to send the respective number of transactions per unit time over each of the set of switches to form an initial total cost of sending a total number of transactions per unit time from the set of switches; and input the total cost into the feedback model to output the new configuration of the first set of the data center devices and the second set of the data center devices, the new configuration further producing a new total cost of sending the total number of transactions per unit time from the set of switches that is less than an expected value of the total cost of sending the total number of transactions per unit time from the set of switches.

8. An apparatus as in claim 7, wherein the data center devices include data routing devices and data destination devices; and wherein receiving the initial value of the flow parameter includes:

obtaining i) a rate at which data is sent through a data routing device and ii) a rate at which the data arrives at a data destination device.

9. An apparatus as in claim 8, wherein, for each of the data routing devices, there is a respective cost to send data through that data routing device; and wherein inputting the flow parameter value difference into the feedback model includes:

performing an optimization operation to minimize a net cost of data flowing from the data routing devices to the data destination devices.

10. An apparatus as in claim 9, wherein, for each of the data destination devices, there is a cost to receive an amount of data at that data destination device; and wherein performing the optimization operation on the sum of costs includes:

adding, to the net cost, costs of the data received at the data destination devices.

11. An apparatus as in claim 7, wherein the controlling circuitry is further constructed and arranged to:

after inputting the flow parameter value difference into the feedback model, perform a reconfiguration operation on the data center devices, the reconfiguration operation arranging the data center devices to produce the new value of the flow parameter output by the systems dynamics engine.

12. An apparatus as in claim 11, wherein the controlling circuitry is further constructed and arranged to:

after performing the reconfiguration operation and after at least one specified time step, i) acquire a time series of the value of the flow parameter, and ii) input the time series into the feedback model to output another value of the flow parameter.

13. A method as in claim 1, wherein outputting, by the feedback model circuitry, the new configuration includes changing data paths along which data is sent within the data center.

14. A method as in claim 13, wherein outputting, by the feedback model circuitry, the new configuration further includes changing a distribution of data stored across the data center.

15. A method as in claim 13, further comprising:

measuring a data center parameter value that reflects actual operation of the data center;

filtering the data center parameter value;

providing the filtered data center parameter value as the initial value to which the expected value of the flow parameter is compared to produce the flow parameter value difference;

processing the flow parameter value difference by a controller; and applying the processed flow parameter value difference as input data to the data center for establishing the new configuration, the data center thereby producing the new value of the flow parameter under closed-loop feedback control.

16. A computer program product having a non-transitory, computer-readable storage medium which stores instructions which, when executed by a computer, cause the computer to perform a method of controlling a configuration of a data center, the data center including data center devices, the method comprising:

receiving, by a measurement module of control circuitry, a set of measurement results that provide respective measured values of device parameters of multiple devices in the data center as the devices operate in the data center in response to requests from hosts, the measurement module acting as a feedback-control sensor;

comparing, by the control circuitry, the measurement results to respective set points input to the control circuitry to produce a set of respective measurement deviations;

providing the measurement deviations to feedback control circuitry, the feedback control circuitry including a system dynamics engine constructed and arranged to output instructions for adjusting the data center to establish new configurations of the data center, the data center acting as a feedback-control plant;

while the data center is operating, adjusting the data center, in accordance with the instructions for adjusting the data center, to implement the new configurations of the data center, said adjusting including changing data paths along which data is sent within the data center; and continuing to operate the data center as a closed-loop system under configuration control of the feedback control circuitry, such that the feedback control circuitry dynamically reconfigures the data center in response to data center operation to drive the measured values of device parameters toward the respective set points.

17. A computer program product as in claim 16, wherein implementing the new configurations of the data center includes changing data paths along which data is sent within the data center.

18. A method as in claim 17, implementing the new configurations of the data center further includes changing a distribution of data stored across the data center.

* * * * *